(12) United States Patent
Fukagawa et al.

(10) Patent No.: US 8,859,060 B2
(45) Date of Patent: Oct. 14, 2014

(54) PROTECTIVE FILM OF POLARIZER, POLARIZER AND LIQUID CRYSTAL DISPLAY DEVICE

(75) Inventors: Nobutaka Fukagawa, Minami-ashigara (JP); Masato Nagura, Minami-ashigara (JP); Yoshio Ishii, Fujinomiya (JP); Takayasu Yasuda, Minami-ashigara (JP); Naoyuki Nishikawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 273 days.

(21) Appl. No.: 12/958,864

(22) Filed: Dec. 2, 2010

(65) Prior Publication Data

US 2011/0134374 A1 Jun. 9, 2011

(30) Foreign Application Priority Data

Dec. 3, 2009 (JP) ................. 2009-275162

(51) Int. Cl.
*G02F 1/1335* (2006.01)
*C09D 101/10* (2006.01)
(Continued)

(52) U.S. Cl.
CPC .......... *C08L 1/10* (2013.01); *C09D 101/10* (2013.01); *C08J 2301/12* (2013.01); *C08J 2301/10* (2013.01); *C08L 1/12* (2013.01); *C08J 5/18* (2013.01); *C09D 101/12* (2013.01); *C08J 2301/14* (2013.01); *C09D 101/14* (2013.01); *C08L 1/14* (2013.01)
USPC ............................ 428/1.33; 544/299; 544/305

(58) Field of Classification Search
CPC ........ B32B 27/18; B32B 23/04; B32B 23/08; B32B 23/14; B32B 23/16; B32B 23/20; C08L 1/08; C08L 1/10; C08L 1/12; C08L 1/14; C08B 3/06; C08B 3/08; C08B 3/10; C08B 3/12; C08B 3/16; C08B 3/18; C09D 101/02; C09D 101/08; C09D 101/10; C09D 101/12; C09D 101/14; G02F 1/133528; G02F 1/133533; G02F 1/133536; G02F 2001/1536; G02F 2001/133311; G02F 2201/50; G02F 2202/06; G02B 5/3025; G02B 5/3041; G02B 5/305; C07D 239/24; C07D 239/28; C07D 239/60; C07D 239/62
USPC ........ 349/96, 193; 428/1.3, 1.6, 1.63; 524/31, 524/100, 155, 284, 556; 544/1, 7, 224, 298, 544/299, 305, 307, 308
See application file for complete search history.

(56) References Cited

U.S. PATENT DOCUMENTS

2005/0045064 A1\* 3/2005 Oya ........................ 106/170.27
2005/0077648 A1\* 4/2005 Sugiura ........................ 264/216
(Continued)

FOREIGN PATENT DOCUMENTS

JP 4136054 B2 12/1998
JP 2002-264153 A 9/2002
(Continued)

OTHER PUBLICATIONS

Abbaspour et al., Acidity Constants and Thermodynamic Parameters of Barbituric and Diethylbarbituric Acids in Water, (Water + Tetrahydrofuran), and (Water + Triton X-100) Systems, 2001, J. Chem. Eng. Data, 46, 623-625.\*

(Continued)

*Primary Examiner* — Erik Kashnikow
*Assistant Examiner* — Eli D Strah
(74) *Attorney, Agent, or Firm* — Sughrue Mion, PLLC

(57) ABSTRACT

A protective film of polarizer comprising an organic acid that has a solubility in water at 25° C. of at most 0.1% by mass and has an acid dissociation constant in a mixed solvent of tetrahydrofuran/water=6/4 by volume at 25° C. of from 2 to 7 can improve polarizer durability.

12 Claims, 1 Drawing Sheet

(51) Int. Cl.
- *C07D 239/62* (2006.01)
- *C08L 1/12* (2006.01)
- *C08J 5/18* (2006.01)
- *C09D 101/12* (2006.01)
- *C08L 1/10* (2006.01)
- *C09D 101/14* (2006.01)
- *C08L 1/14* (2006.01)

(56) References Cited

U.S. PATENT DOCUMENTS

2006/0051523 A1* 3/2006 Morishima et al. ............ 428/1.1
2006/0232726 A1* 10/2006 Omatsu et al. ................. 349/96
2008/0192192 A1* 8/2008 Toyama et al. ............... 349/117

FOREIGN PATENT DOCUMENTS

JP 2003-170447 A 6/2003
WO 2006/095815 A1 9/2006

OTHER PUBLICATIONS

Nightingale et al., Phenyl Alkyl Nitrogen Substitution and Reactivity in the Barbituric Acid Series, 1939, Journal of the American Chemical Society, vol. 61, 1015-1017.*

Office Action dated May 7, 2013 issued from the Japanese Patent Office in Japanese Application No. 2009-275162.

* cited by examiner

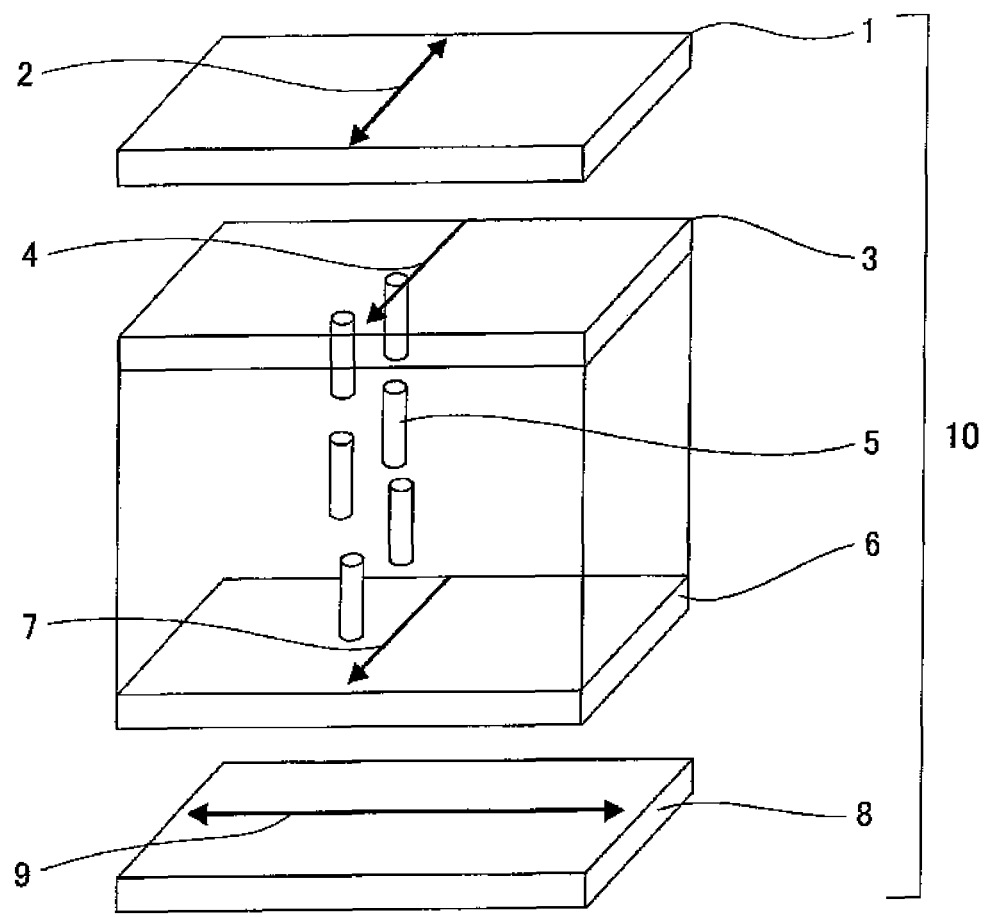

PROTECTIVE FILM OF POLARIZER, POLARIZER AND LIQUID CRYSTAL DISPLAY DEVICE

CROSS-REFERENCE TO RELATED APPLICATIONS

The present application claims the benefit of priority from Japanese Patent Application No. 275162/2009 filed on Dec. 3, 2009, the contents of which are herein incorporated by reference in their entirety.

BACKGROUND OF THE INVENTION

1. Field of the Invention

The invention relates to a protective film of polarizer, polarizer and a liquid crystal device produced by use of the protective film of a polarizer.

2. Description of the Related Art

Applications of liquid crystal display devices are expanding year by year as power-saving and space-saving image display devices. Heretofore, one serious defect of liquid crystal display devices is that the viewing angle dependence of displayed image is large. Recently, however, various types of wide viewing angle-mode (for example VA-mode) liquid crystal display devices have been put into practical use, and in that situation, the demand for liquid crystal display devices is rapidly expanding even in the market such as the TV market which requires high image quality.

The basic constitution of a liquid crystal display device is such that a polarizer is provided on both sides of a liquid crystal cell. The polarizer plays a role in transmitting therethrough only the light polarized in a certain direction, and the performance of a liquid crystal display device is greatly influenced by the performance of the polarizer in the device. The polarizer is generally so designed that a transparent protective film is stuck to both the surface and the back of the polarizing element therein formed of an oriented, and iodide or dye-adsorbing polyvinyl alcohol film or the like. A cellulose acylate film, typically cellulose acetate, is highly transparent and readily secures good adhesiveness to polyvinyl alcohol for use as a polarizing element, and therefore it has been widely used as a protective film of polarizer.

With the recent expansion of applications of liquid crystal display devices, large-size and high-quality applications of TVs and others have become enlarging, and the demand for high-quality polarizers and protective films thereof is much increasing these days. In particular, use of large-size and high-quality liquid crystal display devices has become much more needed in various severe environments, for example, for outdoor use or the like than before. From such viewpoints, recently, for protective films of polarizers for use in liquid crystal display devices, improvement of both polarizer durability at high temperature and high humidity and polarizer durability at high temperature and low humidity has become greatly required.

Regarding this, a method of improving the polarizer durability at high temperature and high humidity has been investigated by making a polarizing element layer have an acidic pH at high temperature and high humidity. For example, Japanese Patent 4136054 discloses a protective film of polarizer that comprises cellulose acetate flakes containing an acid having an acid dissociation index in an aqueous solution of from 1.93 to 4.50.

On the other hand, WO2006/095815 discloses a method for producing a polarizer film having excellent wet heat durability and preferably, additionally having dry heat durability by processing, after stretching treatment thereof, a polyvinyl resin film containing iodine, iodide, crosslinking agent and/or water-proofing agent, with an acid processing solution having a pH to fall in a range of $2.4 \leq pH < 6.0$.

SUMMARY OF THE INVENTION

The present inventors have investigated the polarizer durability of the film containing the compound described in Japanese Patent 4136054, and have known that the polarizer durability at high temperature and high humidity could be surely improved but the polarizer durability at high temperature and low humidity is rather worsened by contraries.

Further, the inventors have investigated the method described in WO2006/095815, and have known that, in order that the transmittance variation is improved up to the level needed recently in the art, the concentration of the weak acid to be used must be remarkably increased up to the degree described in Example 13 in the patent publication and only when the concentration thereof could be increased so, the desired improvement could be attained eventually, or that is, the disclosed method still has the problem to be solved in point of the production cost, etc.

Specifically, a protective film of polarizer improved both in point of the polarizer durability at high temperature and high humidity and in point of the polarizer durability at high temperature and low humidity is known little up to now, and improving the existing protective film of polarizer is desired.

An object of the invention is to provide a protective film of polarizer improved both in point of the polarizer durability at high temperature and high humidity and in point of the polarizer durability at high temperature and low humidity. Another object of the invention is to provide a polarizer comprising the protective film of polarizer, and a liquid crystal display device comprising the protective film of polarizer or the polarizer.

To solve the above-mentioned problems, the present inventors have assiduously studied and, as a result, have found that, when an organic acid having low solubility in water and having an acid dissociation constant (this may be referred to as pKa below) in a mixed solvent of tetrahydrofuran (THF)/water=6/4 by volume to fall within a predetermined range is used, then the organic acid added to the protective film of polarizer could move to the polarizing element layer at high temperature and high humidity to make the polarizing element layer acidic, but the organic acid could stay in the protective film of polarizer at high temperature and low humidity and therefore the pH of the polarizing element layer does not lower.

Further, the inventors have found that, at high temperature and high humidity, the polarizer durability is improved when the polarizing element layer is acidic, but nevertheless at high temperature and low humidity, surprisingly the polarizer durability is improved when the pH of the polarizing element layer does not lower.

Specifically, the above-mentioned problems can be solved by the constitution of the invention mentioned below.

[1] A protective film of polarizer comprising an organic acid that has a solubility in water at 25° C. of at most 0.1% by mass and has an acid dissociation constant in a mixed solvent of tetrahydrofuran/water=6/4 by volume at 25° C. of from 2 to 7.

[2] The protective film of polarizer of [1], wherein the molecular weight of the organic acid is from 200 to 600.

[3] The protective film of polarizer of [1] or [2], comprising a cellulose acylate resin.

[4] The protective film of polarizer of any one of [1] to [3], wherein the organic acid has an aromatic ring structure.

[5] The protective film of polarizer of any one of [1] to [4], wherein the organic acid is represented by the following formula (1), (2) or (3):

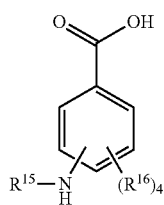

Formula (1)

wherein $R^{15}$ represents a hydrogen atom, an acyl group or a sulfonyl group; $R^{16}$ each independently represents a hydrogen atom or a halogen atom; and $R^{15}$ may have a substituent,

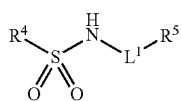

Formula (2)

wherein $R^4$ and $R^5$ each independently represent a hydrogen atom, an alkyl group or an aryl group; $R^4$ and $R^5$ each may have a substituent, and may bond to each other to form a ring; and $L^1$ represents —$SO_2$— or —CO—,

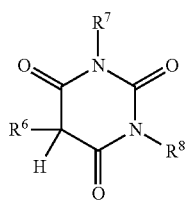

Formula (3)

wherein $R^6$ represents an aryl group, $R^7$ and $R^8$ each independently represent a hydrogen atom, an alkyl group or an aryl group; and $R^6$ and $R^7$ each may have a substituent.
[6] The protective film of polarizer of any one of [1] to [5], wherein the organic acid has a heterocyclic structure containing an oxygen atom, a nitrogen atom or a sulfur atom.
[7] A polarizer comprising at least one protective film of polarizer of any one of [1] to [6].
[8] A liquid crystal display device comprising at least one of the protective film of polarizer of any one of [1] to [6] or the polarizer of [7].

When the film of the invention is stuck to a polarizing element and the resultant polarizer is aged, the polarizing element is protected from being deteriorated. In particular, according to the invention, both the polarizer durability at high temperature and high humidity and the polarizer durability at high temperature and low humidity can be improved. The invention can also provide a polarizer comprising the protective film of polarizer, and a liquid crystal display device comprising the protective film of polarizer or the polarizer.

BRIEF DESCRIPTION OF THE DRAWING

FIG. 1 is a schematic view which shows an exemplary example of the liquid crystal display device according to an aspect of the invention.

In the drawing, 1 denotes upper polarizer, 2 denotes absorption axis direction of upper polarizer, 3 denotes upper electrode substrate of liquid crystal cell, 4 denotes alignment control direction of upper substrate, 5 denotes liquid crystal layer, 6 denotes lower electrode substrate of liquid crystal cell, 7 denotes alignment control direction of lower substrate, 8 denotes lower polarizer, 9 denotes absorption axis direction of lower polarizer and 10 donates liquid crystal display device.

BEST MODE FOR CARRYING OUT THE INVENTION

Description will now be made in detail of the protective film of polarizer, polarizer and liquid crystal display device according to the invention. Although the following description of its structural features may often be made on the basis of typical embodiments of the invention, it is to be understood that the invention is not limited to any such embodiment. It is also to be noted that every numerical range as herein expressed by employing the words "from" and "to", or simply the word "to", or the symbol "~" is supposed to include the lower and upper limits thereof as defined by such words or symbol, unless otherwise noted. In the invention, "mass %" means equal to "weight %", and "% by mass" means equal to "% by weight".

[Protective Film of Polarizer]

The protective film of polarizer of the invention (this may be referred to as the film of the invention below) contains an organic acid that has a solubility in water at 25° C. of at most 0.1% by mass and has an acid dissociation constant in a mixed solvent of THF/water=6/4 by volume at 25° C. of from 2 to 7. Containing the organic acid, the film of the invention improves both the polarizer durability at high temperature and high humidity and the polarizer durability at high temperature and low humidity.

The organic acid and the film substrate for use in the film of the invention, and the production method for the film of the invention are described below.

<Organic Acid>
(Solubility)

The organic acid to be contained in the film of the invention has a solubility in water at 25° C. of at most 0.1% by mass. Preferably, the solubility of the organic acid in water at 25° C. is at most 0.06% by mass, more preferably at most 0.03% by mass.

For the method for measuring the solubility in the invention, referred to is the method described in Experimental Chemistry Course, No. 4 (by Maruzen), pp. 153-156.

(Acid Dissociation Constant)

The organic acid to be contained in the film of the invention has an acid dissociation constant in a mixed solvent of THF/water=6/4 by volume at 25° C. of from 2 to 7. Preferably, the acid dissociation constant of the organic acid in a mixed solvent of THF/water=6/4 by volume at 25° C. is from 2.5 to 7, more preferably from 2.5 to 6.5, even more preferably from 3 to 5.

For the method for measuring the acid dissociation constant in the invention, referred to is the alkali titration method described in Experimental Chemistry Course, No. 2 (by Maruzen), pp. 215-217.

(Molecular Weight)

The molecular weight of the organic acid to be contained in the film of the invention is preferably from 200 to 600, more preferably from 250 to 550, even more preferably from 280 to 500. When the molecular weight is not lower than the lowermost limit of the range, it is favorable for improving the polarizer durability at high temperature and low humidity; and when the molecular weight is not more than the uppermost limit of the range, it is favorable for improving the polarizer durability at high temperature and high humidity.

(Structure)

Preferably, the organic acid to be contained in the film of the invention contains an aromatic ring structure, more preferably contains an aryl group having from 6 to 12 carbon atoms, and even more preferably contains a phenyl group. The aromatic ring structure of the organic acid may form a condensed ring with the other ring. The aromatic ring structure of the organic acid may have a substituent, and the substituent is not specifically defined so far as it is not contradictory to the spirit and the scope of the invention. Preferably, the substituent is a halogen atom or an alkyl group, more preferably a halogen atom or an alkyl group having from 1 to 6 carbon atoms, even more preferably a chlorine atom or a methyl group.

More preferably, the organic acid is represented by any of the above-mentioned general formula (1), (2) or (3). Preferred embodiments of the organic acid are described below in order of the general formulae (1) to (3).

1. Organic Acid Represented by the Formula (1)

The organic acid is preferably represented by the following formula (1):

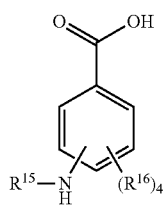

Formula (1)

In the formula (1), $R^{15}$ represents a hydrogen atom, an acyl group or a sulfonyl group, each of $R^{16}$ independently represents a hydrogen atom or a halogen atom, and $R^{15}$ may have a substituent.

$R^{15}$ is preferably a hydrogen atom or an acyl group, more preferably a hydrogen atom or an acyl group having a carbon number of 2 to 5.

Each of $R^{16}$ is independently preferably a hydrogen atom, a fluorine atom or an iodine atom, and each of $R^{16}$ may be different or the same.

The substituent which $R^{15}$ may have is not particularly limited so long as the object of the invention is attained. The substituent is preferably an aryl group, more preferably a substituted phenyl group. In the case where the phenyl group has a substituent, the substituent is preferably an alkyl group, more preferably an alkyl group having a carbon number of 1 to 5. The phenyl group may have 2 or more substituents.

Examples of the organic acid represented by the formula (1) are shown herein under; the invention is not limited by the following examples. The organic acids (1-1) to (1-3) are each correspondent to organic acids B to D used in Examples of this invention.

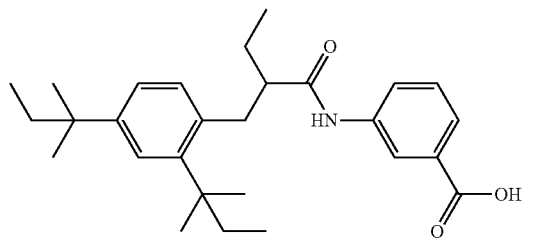

(1-1)

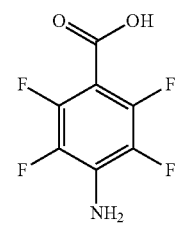

(1-2)

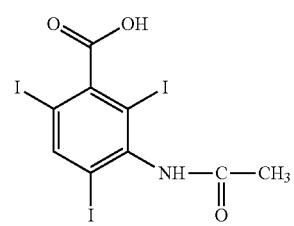

(1-3)

2. Organic Acid Represented by the Formula (2)

The organic acid is preferably represented by the following formula (2):

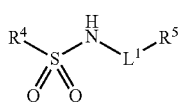

Formula (2)

In the formula (2), each of $R^4$ and $R^5$ independently represent a hydrogen atom, an alkyl group or an aryl group, $R^4$ and $R^5$ may have a substituent, $R^4$ and $R^5$ may combine each other to form a ring, $L^1$ represents —$SO_2$— or —CO—.

$R^4$ is preferably an aryl group having a carbon number of 6 to 18, more preferably an aryl group having a carbon number of 6 to 12, particularly preferably a phenyl group.

$R^5$ is preferably an alkyl group having a carbon number of 1 to 12 or an aryl group having a carbon number of 6 to 12, more preferably a methyl group or an aryl group having a carbon number of 6 to 12, particularly preferably a phenyl group.

The substituent which $R^4$ and $R^5$ may have is not particularly limited so long as the object of the invention is attained. The substituent is preferably a halogen atom or an alkyl group, more preferably a halogen atom or an alkyl group having a carbon number of 1 to 6, particularly preferably a chlorine atom or a methyl group.

In the case where $R^4$ and $R^5$ combine each other to form a ring, the ring is preferably an aromatic cyclic structure; and the aromatic cyclic structure is preferably an aryl group having a carbon number of 6 to 12, particularly preferably a phenyl group.

$L^1$ is preferably —$SO_2$— or —CO—.

Examples of the organic acid represented by the formula (2) are shown herein under; the invention is not limited by the following examples. The organic acid (2-1) is correspondent to organic acid H used in Examples of this invention.

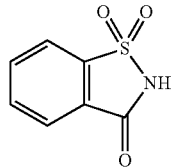 (2-1)

3. Organic Acid Represented by the Formula (3)

The organic acid is preferably represented by the following formula (3):

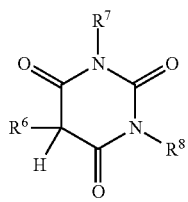

Formula (3)

In the formula (3), $R^6$ represents an aryl group, each of $R^7$ and $R^8$ independently represents a hydrogen atom, an alkyl group and an aryl group, and $R^6$ and $R^7$ may have a substituent.

$R^6$ is preferably an aryl group having a carbon number of 6 to 18, more preferably an aryl group having a carbon number of 6 to 12, particularly preferably a phenyl group.

Each of $R^7$ and $R^8$ is independently preferably a hydrogen atom, an alkyl group having a carbon number of 1 to 12 (including a cycloalkyl group) or an aryl group having a carbon number of 6 to 12, more preferably a hydrogen atom, an alkyl group having a carbon number of 1 to 6 (including a cycloalkyl group) or a phenyl group, particularly preferably a hydrogen atom, a methyl group, an ethyl group, a cyclohexyl group or a phenyl group.

The substituent which $R^6$ may have is not particularly limited so long as the object of the invention is attained. The substituent is preferably a halogen atom or an alkyl group, more preferably a halogen atom or an alkyl group having a carbon number of 1 to 6, particularly preferably a chlorine atom or a methyl group.

The substituents which $R^7$ or $R^8$ may have are not particularly limited so long as the object of the invention is attained. The substituent is preferably an aryl group having a carbon number of 6 to 12, more preferably a phenyl group.

Examples of the organic acid represented by the formula (3) are shown herein under; the invention is not limited by the following examples. The organic acid (3-3) is correspondent to organic acid A used in Examples of this invention.

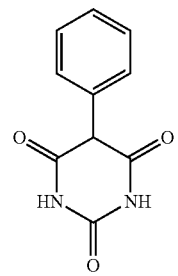 (3-1)

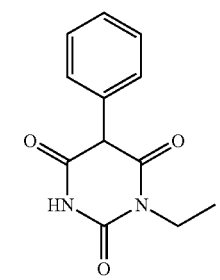 (3-2)

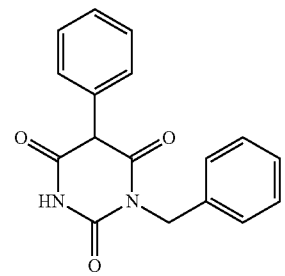 (3-3)

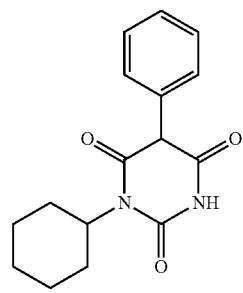 (3-4)

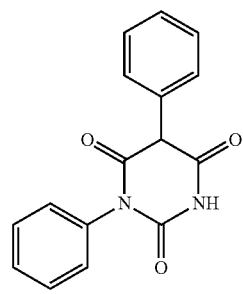 (3-5)

(3-6)

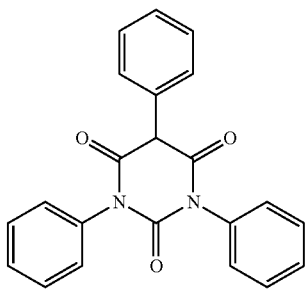

(3-7)

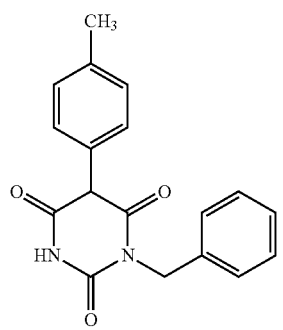

(3-8)

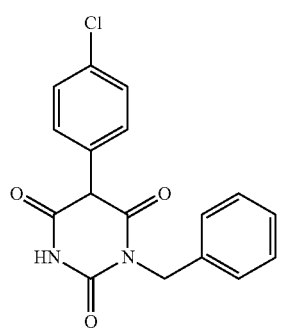

(3-9)

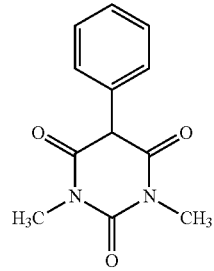

The organic acid further preferably has a hetero ring unit including an oxygen atom, a nitrogen atom or a sulfur atom.
(Method for Obtaining Organic Acid)

The organic acid for use in the invention is commercially available or may be produced according to a known method. For example, the organic acid of formula (2) may be produced according to the production method described in JP-B 2-30498.
(Content of Organic Acid)

Preferably, the content of the organic acid is from 1 to 20% by mass of the resin to constitute the substrate film. When the content is at least 1% by mass, the film may readily exhibit the polarizer durability improving effect; and when at most 20% by mass, then the acid would hardly bleed out or seep out from the formed protective film of polarizer. More preferably, the content of the organic acid is from 1 to 15% by mass, even more preferably from 1 to 10% by mass.

<Film Substrate>

The film substrate for use for the film of the invention is described below.

Any known resin is usable for the film substrate for the film of the invention with no specific limitation, not contradictory to the scope and the spirit of the invention. The film substrate includes cellulose acylate, acrylic resin, cycloolefin resin; and among them, cellulose acylate resin is preferred. Specifically, the film of the invention preferably contains a cellulose acylate resin.

The cellulose acylate for use in the invention is described in detail below.

The substitution degree of cellulose acylate means a proportion at which three hydroxyl groups present in the cellulose constituent unit (glucose bonded to beta-1,4-glycoside) are acylated. The substitution degree (acylation degree) can be calculated by measuring the amount of a fatty acid bonded per the constituent unit mass of cellulose. In the invention, the substitution degree of a cellulose form can be calculated by dissolving the cellulose farm in a solvent such as deuterium-substituted dimethylsulfoxide, measuring the $C^{13}$-NMR spectrum, and determining the substitution degree from the peak intensity ratio of carbonyl carbons in the acyl group. The substitution degree of a cellulose form can be calculated by $C^{13}$-NMR measurement after substituting the residual hydroxyl group of a cellulose acylate by another acyl group different from the acyl group in the cellulose acylate itself. Details of the measuring method are described in Tezuka et al., Carbohydrate Res., 273, 83-91 (1995).

The cellulose acylate for use in the invention is preferably a cellulose acetate having a total degree of acyl substitution of from 2.0 to 2.97, more preferably from 2.2 to 2.95, and particularly preferably from 2.3 to 2.95. The organic acid used for the invention shows high polarizer durability improvement effect, when it is used together with the cellulose acylate of the range of such a total degree of acyl substitution especially.

The acyl group of the cellulose acylate for use in the invention is particularly preferably an acetyl group, a propionyl group and a butyryl group.

In the invention, another preferred cellulose acylate for use in the invention is a mixed fatty acid ester having two or more kinds of acyl groups, and containing an acetyl group and an acyl group having a carbon number of 3 to 4 is preferable for the acyl group in this case. In the case where the mixed fatty acid ester is used, the a degree of acetyl substitution thereof is preferably less than 2.5, more preferably from less than 1.9; and a degree of acyl group substitution having a carbon number of 3 to 4 is preferably 0.1 to 1.5, more preferably 0.2 to 1.2, particularly preferably 0.5 to 1.1.

In the invention, two kinds of cellulose acylate having different substituent and/or different degree of substitution may be used in combination and mixed, and a film comprising two or more layers composed of different cellulose acylate may be formed, for example, by a co-casting method described later.

Furthermore, the mixed acid ester having a fatty acid acyl group and a substituted or unsubstituted aromatic acyl group described in paragraphs [0023] to [0038] of JP-A 2008-20896 may also be preferably used in the invention.

The cellulose acylate for use in the invention preferably has a mass average polymerization degree of 250 to 800, more preferably from 300 to 600. Also, the cellulose acylate for use in the invention preferably has a number average molecular weight of 70,000 to 230,000, more preferably from 75,000 to 230,000, and most preferably from 78,000 to 120,000.

The cellulose acylate for use in the invention can be synthesized using an acid anhydride or an acid chloride as the acylating agent. In the case where the acylating agent is an acid anhydride, an organic acid (e.g., acetic acid) or methylene chloride is used as the reaction solvent. Also, a protonic catalyst such as sulfuric acid may be used as the catalyst. In the case where the acylating agent is an acid chloride, a basic compound can be used as the catalyst. In a synthetic method most commonly employed in industry, a cellulose ester is synthesized by esterifying a cellulose with a mixed organic acid component containing an acetyl group and an organic acid (acetic acid, propionic acid, butyric acid) corresponding to other acyl group, or its acid anhydride (acetic anhydride, propionic anhydride, butyric anhydride).

In the above-described method, cellulose such as cotton linter or wood pulp is in many cases subjected to an activation treatment with an organic acid such as acetic acid and then to esterification using a mixed solution of organic acid components described above in the presence of a sulfuric acid catalyst. The organic acid anhydride component is generally used in an excess amount with respect to the amount of the hydroxyl group present in the cellulose. In the esterification treatment, a hydrolysis reaction (depolymerization reaction) of the cellulose main chain (beta-1,4-glycoside bond) proceeds in addition to an esterification reaction. If the hydrolysis reaction of the main chain proceeds, the polymerization degree of the cellulose ester decreases and the physical properties of the produced cellulose ester film are deteriorated. Accordingly, the reaction conditions such as reaction temperature are preferably determined by taking into consideration the polymerization degree or molecular weight of the cellulose ester obtained.

<Production of Protective Film of Polarizer>

The protective film of polarizer of the invention can be produced by a solvent casting method. Although the mode which used cellulose acylate resin as a film substrate is hereafter explained about the production method of the protection film of polarizer of the invention for an example, the protection film of polarizer of the invention can be manufactured similarly by using the other kinds of resin is used. In the solvent casting method, the film is produced using a solution (dope) prepared by dissolving a cellulose acylate in an organic solvent.

The solvent for use in preparing the dope may be selected from an organic solvent. Preferably, the organic solvent includes at lest one selected from ethers having from 3 to 12 carbon atoms, ketones having from 3 to 12 carbon atoms, esters having from 3 to 12 carbon atoms, and halogenohydrocarbons having from 1 to 6 carbon atoms.

The esters, the ketones and the ethers may have a cyclic structure. Compounds having two or more functional groups of esters, ketones and ethers (i.e., —O—, —CO— and —COO—) are also usable herein as a main solvent; and they may have any other functional group such as an alcoholic hydroxyl group. In the case where the main solvent has two or more functional groups, the number of the carbon atoms constituting them may fall within a range of the number of carbon atoms that constitute the compound having any of those functional groups.

Examples of the ethers having from 3 to 12 carbon atoms are diisopropyl ether, dimethoxymethane, dimethoxyethane, 1,4-dioxane, 1,3-dioxolane, tetrahydrofuran, anisole and phenetole.

Examples of the ketones having from 3 to 12 carbon atoms are acetone, methyl ethyl ketone, diethyl ketone, diisobutyl ketone, cyclohexanone, and methylcyclohexanone.

Examples of the esters having from 3 to 12 carbon atoms are ethyl formate, propyl formate, pentyl formate, methyl acetate, ethyl acetate, and pentyl acetate.

Examples of the organic solvents having two or more functional groups are 2-ethoxyethyl acetate, 2-methoxyethanol, and 2-butoxyethanol.

The halogenated hydrocarbon having from 1 to 6 carbon atoms preferably has one or two carbon atoms, and more preferably has one carbon atom. The halogen atom of the halogenated hydrocarbon preferably is chlorine. The ratio of the substitution of hydrogen with halogen is preferably in the range of 25 to 75 mol %, more preferably in the range of 30 to 70 mol %, further preferably in the range of 35 to 65 mol %, and most preferably in the range of 40 to 60 mol %. Methylene chloride is a representative halogenated hydrocarbon.

Two or more organic solvents can be used in combination.

A cellulose acylate solution (dope) can be prepared according to a general method. The general method means that the cellulose acylate solution is prepared at a temperature of not lower than 0° C. (ordinary or elevated temperature). The preparation of the solution can be conducted by using a process and apparatus for preparation of a dope in a general solvent casting method. The general method preferably uses a halogenated hydrocarbon (particularly methylene chloride) as an organic solvent.

The amount of cellulose acylate in the cellulose acyolate solution is so adjusted that a prepared solution contains cellulose acylate in an amount of 10 to 40% by mass. The amount of cellulose acylate more preferably is 10 to 30% by mass. An optional additive (described below) can be added to an organic solvent.

The cellulose acylate solution can be prepared by stirring cellulose acylate and an organic solvent at an ordinary temperature (0 to 40° C.). A solution of a high concentration is preferably prepared by stirring them at an elevated temperature and at a high pressure. In more detail, cellulose acylate and the organic solvent are placed in a closed vessel, and are stirred at an elevated temperature and at a high pressure, which is higher than the boiling point of the solvent at atmospheric pressure and is lower than the boiling point of the solvent at the high pressure. The heating temperature is usually not-lower than 40° C., preferably in the range of 60 to 200° C., and more preferably in the range of 80 to 110° C.

The ingredients may be put into a chamber, after roughly mixed. They may be put into a chamber successively. The chamber must be so designed that the contents may be stirred therein. An inert gas such as nitrogen gas may be introduced into the chamber and the chamber may be pressurized. As the case may be, the chamber may be heated to increase the vapor pressure of the solvent, and the pressure increase may be utilized in stirring the contents of the chamber. If desired, after the chamber is closed airtightly, the ingredients may be added thereinto under pressure.

In heating it, preferably, the chamber is heated outside it. For example, a jacket-type heater may be used. A plate heater may be provided outside the chamber, and a liquid may be circulated in the pipe fitted to the heater to thereby heat the whole of the chamber.

Preferably, a stirring blade may be disposed inside the chamber, with which the contents of the chamber may be stirred. Preferably, the length of the stirring blade may reach near the wall of the chamber. Also preferably, the tip of the stirring blade may be provided with a scraper so as to renew the liquid film on the inner wall of the chamber.

The chamber may be provided with instruments such as pressure gauze, thermometer, etc. In the chamber, the ingredients are dissolved in a solvent. The thus-prepared dope is taken out of the chamber after cooled, or after taken out, it may be cooled with a heat exchanger or the like.

The solution may also be prepared according to a cooling and dissolving method. As for details of the cooling dissolution method, the techniques described in to [0122] of JP-A 2007-86748 may be employed.

In the cooling and dissolving method, cellulose acylate may be dissolved even in an organic solvent in which it is hardly dissolved in an ordinary dissolving method. Even a solvent in which cellulose acylate can be dissolved in an ordinary dissolving method may enjoy the advantage of the cooling dissolving method capable of rapidly producing a uniform solution.

According to the cooling dissolution method, at first, cellulose acylate is gradually added to an organic solvent while stirring at room temperature. The amount of cellulose acylate is in the range of 10 to 40% by mass, based on the amount of the mixture. The amount is preferably in the range of 10 to 30% by mass. An optional additive (described below) may be added to the solvent.

At the next stage, the mixture is cooled to a temperature of −100 to −10° C., preferably −80 to −10° C., more preferably −50 to −20° C., and most preferably −50 to −30° C. The mixture can be cooled in a dry ice/methanol bath (−75° C.) or in a cooled diethylene glycol solution (−30 to −20° C.). At the cooling stage, the mixture of cellulose acylate and the solvent generally solidify.

The cooling rate is preferably faster than 4° C. per minute, more preferably faster than 8° C. per minute, and most preferably faster than 12° C. per minute. The cooling rate is preferably fast as possible. However, a theoretical upper limit of the cooling rate is 10,000° C. per second, a technical upper limit is 1,000° C. per second, and a practical upper limit is 100° C. per second. The cooling rate means the change of temperature at the cooling stage per the time taken to complete the cooling stage. The change of temperature means the difference between the temperature at which the cooling stage is started and the temperature at which the cooling stage is completed.

Subsequently, the mixture is warmed to a temperature of 0 to 200° C., preferably 0 to 150° C., more preferably 0 to 120° C., and most preferably 0 to 50° C. to dissolve the cellulose acylate in the solvent. The mixture can be warmed by keeping it at room temperature. The mixture can also be warmed on a bath. The warming rate is preferably faster than 4° C. per minute, more preferably faster than 8° C. per minute, and most preferably faster than 12° C. per minute. The warming rate is preferably fast as possible. However, a theoretical upper limit of the warming rate is 10,000° C. per second, a technical upper limit is 1,000° C. per second, and a practical upper limit is 100° C. per second. The warming rate means the change of temperature at the warming stage per the time taken to complete the warming stage. The change of temperature means the difference between the temperature at which the warming stage is started and the temperature at which the warming stage is completed.

Thus a dope is formed as a uniform solution. If cellulose acylate is not sufficiently dissolved, the cooling and warming steps can be repeated. The dope is observed with eyes to determine whether cellulose acylate is sufficiently dissolved or not.

A sealed vessel is preferably used in the cooling dissolution method to prevent contamination of water, which is caused by dew condensation at the cooling step. The time for the cooling and warming stages can be shortened by conducting the cooling step at a high pressure and conducting the warming step at a law pressure. A pressure-resistance vessel is preferably used for applying a high or low pressure.

In the case that cellulose acetate (acetic acid content: 60.9%, viscosity average degree of polymerization: 299) is dissolved in methyl acylate by a cooling dissolution method to form 20% by mass solution, the solution has a pseudo sol-gel phase transition point at about 33° C., which is measured by a differential scanning calorimeter (DSC). Under the transition point, the solution forms a uniform gel. Therefore, the solution should be stored at a temperature higher than the transition point, preferably at a temperature about 10° C. higher than the point. The pseudo sol-gel phase transition point depends on the combined average acetic acid content of cellulose acylate, the viscosity average degree of polymerization, the concentration of the dope and the nature of the solvent.

The cellulose acetate film is produced by a solvent casting method with the obtained cellulose acetate solution (dope). Any retardation enhancer is preferably added to the dope. The dope is cast on a drum or a band, and the solvent is evaporated away to form a film. Before casting, preferably, the dope is so controlled as to have a solid concentration of from 18 to 35%. Preferably, the surface of the drum or the band is mirror-finished. Preferably, the dope is cast onto the drum or the band at a temperature not higher than 10° C.

The drying stages of the solvent cast methods are described in U.S. Pat. Nos. 2,336,310, 2,367,603, 2,492,078, 2,492,977, 2,492,978, 2,607,704, 2,739,069, 2,739,070, British Pat. Nos. 640,731, 736,892, Japanese Patent Publication Nos. 45 (1970)-4554, 49 (1974)-5614, Japanese Patent Provisional Publication Nos. 60 (1985)-176834, 60 (1985)-203430 and 62 (1987)-115035. The drying step on the band or drum may be carried out while air or inactive gas such as nitrogen is sent.

The formed film is peeled away from the drum or the band, and then it may be further dried with a high-temperature air flow having a successively changing temperature of from 100 to 160° C., thereby removing the residual solvent through evaporation. The process is described in JP-B 5-17844. According to the process, the time from the casting to the peeling may be shortened. In carrying out the process, the dope must be gelled at the surface temperature of the drum or the band on which it is cast.

Using the prepared cellulose acylate solution (dope), two or more layers may be cast for film formation. In this case, preferably, the cellulose acylate film is formed according to a solvent casting method. A dope is cast on a drum or a band, and the solvent is evaporated away to form a film. Before cast, preferably, the dope is so controlled as to have a solid concentration of from 10 to 40%. Preferably, the surface of the drum or the band is mirror-finished.

In the case where two or more layers are formed, two or more cellulose acylate solutions (dopes) may be cast. Concretely, through two or more casting mouths provided at intervals in the moving direction of the support, cellulose acylate solutions (dopes) are cast and laminated to form a film. For example, the method described in JP-A 61-158414, 1-122419 and 11-198285 can be employed. Cellulose acylate solutions (dopes) may be cast through two casting mouths to form a film. For example, the method described in JP-B 60-27562, JP-A 61-94724, 61-947245, 61-104813, 61-158413 and 6-134933 can be employed. Also employable is a casting method for a cellulose acylate film, comprising enveloping a flow of a high-viscosity cellulose acylate solution with a low-viscosity cellulose acylate solution and simultaneously casting the high/low-viscosity cellulose acylate solutions, as in JP-A 56-162617.

Another method of using two casting mouths is also employable, in which a dope is cast through the first casting mouth onto a support, then the resulting film is peeled away, and another dope is cast onto the film on the side thereof having faced the support, thereby producing a laminate film. For example, the method described in JP-B 44-20235 is referred to.

The same cellulose acylate solution or different cellulose acylate solution may be used. In order to make two or more cellulose acylate layers have their respective functions, cellulose acylate solutions corresponding to the functions may be cast out through the respective casting mouths. Further, in the invention, the cellulose acylate solution may be cast along with any other solutions of other functional layers (e.g., adhesive layer, dye layer, antistatic layer, antihalation layer, UV absorbent layer, polarizing layer, etc.).

(Adding Reagents)

In the invention, the timing when the organic acid is added to the cellulose acylate solution is not particularly limited; if it is added before a film is manufactured. For example, it may be added to the cellulose acylate solution at the time of synthesizing cellulose acylate, or at the time of preparing a dope.

Aging inhibitors (e.g., antioxidant, peroxide decomposing agent, radical inhibitor, metal inactivator, acid scavenger, amine) may be added to the protective film of polarizer. Aging inhibitors are described in JP-A 3-199201, 5-197073, 5-194789, 5-271471, 6-107854. The amount of the aging inhibitor to be added is preferably from 0.01 to 1% by mass of the prepared solution (dope), more preferably from 0.01 to 0.2% by mass. The amount of the aging inhibitor to be added is preferably 0.01% by mass or more from the viewpoint that the aging inhibitor added can exhibit its effect, and is preferably 1% by mass or less from the view point of that the aging inhibitor added does not bleed out on the film surface. Especially preferred examples of the aging inhibitor for use herein are butylated hydroxytoluene (BHT) and tribenzylamine (TEA).

The protective film of polarizer of the invention preferably contains fine particles as a mat agent. The fine particles usable in the invention are silicon dioxide, titanium dioxide, aluminium oxide, zirconium oxide, calcium carbonate, talc, clay, calcined kaolin, calcined calcium silicate, calcium silicate hydrate, aluminium silicate, magnesium silicate, and calcium phosphate. Preferably, the fine particles contain silicon as they are effective for reducing the haze of films. Especially preferably, they are silicon dioxide. It is desirable that the silicon dioxide fine particles have a primary mean particle size of at most 20 nm and an apparent specific gravity of at least 70 g/liter. More preferably, the mean particle size of the primary particles is small, falling between 5 and 16 nm, as they are effective for reducing the haze of the film. More preferably, the apparent specific gravity is from 90 to 200 g/liter, even more preferably from 100 to 200 g/liter. The particles having a larger apparent specific gravity may make it easier to form a dispersion having a higher concentration, and they are desirable as reducing the film haze and as preventing the formation of aggregates of the particles in the film.

The fine particles generally form secondary particles having a mean particle size of from 0.1 to 3.0 µm, and they exist as aggregates of their primary particles in the film, therefore forming projections having a size of from 0.1 to 3.0 µm in the film surface. The secondary mean particle size is preferably from 0.2 µm to 1.5 µm, more preferably from 0.4 µm to 1.2 µm, most preferably from 0.6 µm to 1.1 µm. The primary and secondary particle sizes are the diameters of the circumscribed circles of the particles in the film observed with a scanning electronic microscope. Concretely, 200 particles in different sites are observed and analyzed, and their mean value is the mean particle size.

As fine particles of silicon dioxide, for example, commercial products of Aerosil. R972, R972V, R974, R812, 200, 200V, 300, R202, OX50, TT600 (all by Nippon Aerosil) are usable. As fine particles of zirconium oxide, for example, commercial products of Aerosil R976 and R811 (both by Nippon Aerosil) are usable.

Of those, Aerosil 200V and Aerosil R972V are fine particles of silicon dioxide having a primary mean particle size of at most 20 nm and having an apparent specific gravity of at least 70 gaiter, and these are especially preferred as they are effective for reducing the friction factor of optical films while keeping the haze of the films low.

One example of the method for preparing a protective film of polarizer comprising particles having a small secondary-particle diameter is carried out using a dispersion of fine particles. The dispersion may be prepared according to some methods. One example is as follows. A dispersion of fine particles is prepared by mixing solvent and fine particles and then stirred the mixture. And the fluid dispersion is added to a small amount of cellulose acylate solution, which is prepared separately, under stirring. Then, the mixture is mixed with a dope fluid of cellulose acylate, that is, a main ingredient. This method is preferable since fine particles of silica dioxide are well dispersed and hardly aggregate each other. Another example is as follows. A small amount of cellulose acylate is added to solvent, and stirred. Then fine particles are added to the mixture and then mixed by using a disperser to prepare "a fine-particle additional fluid". The fine-particle additional fluid is mixed with a dope fluid fully by using in-line mixer. Any method of them may be adapted, and the method is not limited to the above mentioned methods. Preferably, the concentration of silica dioxide fine particles to be mixed and dispersed in a solvent to prepare a dispersion of the particles is from 5 to 30% by mass, more preferably from 10 to 25% by mass, even more preferably from 15 to 20% by mass. The dispersion concentration is preferably higher, as the liquid turbidity could be smaller relative to the amount of the particles in the dispersion, the haze of the film could be lower and the content of the aggregates in the film could be smaller. The amount of the mat agent to be finally in the polymer dope solution is preferably from 0.01 to 1.0 g per 1 $m^2$, more preferably from 0.03 to 0.3 g per 1 $m^2$, and even more preferably from 0.08 to 0.16 g per 1 $m^2$.

Examples of the solvent to be used in the method described above include lower alcohols such as methyl alcohol, ethyl alcohol, propyl alcohol, isopropyl alcohol, butyl alcohol. The other solvents than such lower alcohols are not specifically defined for use herein. Preferably, the solvents generally used in film formation from cellulose acylate may be used.

These processes from casting to post-drying may be under air atmosphere, and may be under inactive gas atmosphere, such as nitrogen gas. The winding machine for use in producing the protective film of polarizer of the invention may be any ordinary one. For example, the film may be wound according to various winding methods of a constant tension method, a constant torque method, a tapered tension method, a programmed tension control method where the internal stress is kept constant, etc.

(Stretching)

The protective film of polarizer of the invention may be produced by stretching. By stretching, it is possible to give desired retardation to the protective film of polarizer. A stretching direction of the film is both preferable in the width direction and in the longitudinal direction.

Examples of the method for stretching a film in the width direction include those described in JP-A S62-115035, JP-A H04-152125, JP-A H04-284211, JP-A H04-298310 and JP-A H11-48271.

Stretching may be carried out under heating. When a film is dried for film-forming, the film may be subjected to a stretching treatment, and this process is effective for the film containing the remaining solvent. Stretching in the longitudinal direction may be carried out, for example, as follows: controlling a feeding roller speed as the film winding speed is faster than the film peeling speed, and then the film is stretched. Stretching in the width direction may be carried out as follows: a film is fed while the film is held both sides of the transverse direction by a tenter, and then the distance between the clips are gradually widened. Or after drying, the film may be stretched by using a stretch machine, preferably stretched uniaxially by using a long-stretch machine.

Preferably, the cellulose acylate film for use in the invention is stretched at a temperature of from (Tg−5° C.) to (Tg+40° C.) where Tg is the glass transition temperature of the cellulose acylate film, more preferably from Tg to (Tg+35° C.), even more preferably from (Tg+10° C.) to (Tg+30° C.). In the case where the film is a dry film, its stretching is preferably at from 130° C. to 200° C.

In the case where the film is, after cast, stretched while the dope solvent still remains therein, the stretching may be attained at a lower temperature than that for stretching of dry film, and in this case, preferably, the film is stretched at from 100° C. to 170° C.

Preferably, the stretching ratio of the film of the invention (percentage of elongation relative to the unstretched film) is from 1% to 200%, more preferably from 5% to 150%. Especially, the stretching ratio for width direction is preferably from 1% to 200%, more preferably from 5% to 150%, particularly preferably from 30% to 45%.

The stretching speed of the film of the invention is preferably from 1%/minute to 300%/minute, more preferably from 10%/minute to 300%/minute, most preferably from 30%/minute to 300%/minute.

Also preferably, the stretched cellulose acylate film for use in the invention is, after stretched to the maximum draw ratio, kept at a draw ratio lower than the maximum draw ratio for a predetermined period of time (the step may be hereinafter referred to as "relaxation step"). Preferably the draw ratio in the relaxation step is from 50% to 99% of the maximum draw ratio, more preferably from 70% to 97%, most preferably from 90% to 95%. The time for the relaxation step is preferably from 1 second to 120 seconds, more preferably from 5 seconds to 100 seconds.

Further more, the cellulose acylate film is more preferably produced by the production method that includes the shrinking step of shrinking the film of the invention in the machine direction with being held by a tenter in the width direction.

In the production method that includes the stretching step of stretching the film of the invention in the width direction and the step of shrinking it in the machine direction (in the longitudinal direction, film traveling direction), the film is held by a pantograph-type or linear motor-type tenter, and while stretched in the width direction, the film may be shrunk in the machine direction by gradually narrowing the distance between the clips.

Above mentioned method means that at least one part of the stretching step and one part of the shrinking step are performed simultaneously.

Concretely, as the stretching device for stretching any one of the machine direction or the transverse direction of the film and simultaneously shrinking it in the other direction with increasing the thickness of the film at the same time, preferably employed is an Ichigane Industry's machine, FITZ. The device is described in JP-A No. 2001-38802.

The stretching ratio in the stretching step and the shrinking ratio in the shrinking step may be suitably selected and determined in accordance with the intended in-plane retardation Re and the thickness-direction retardation Rth of the film. Preferably, the stretching ratio in the stretching step is at least 10%, and the shrinking ratio in the shrinking step is at least 5%.

Especially, the production method preferably includes the step of stretching the film at least 10% in the width direction and the step of shrinking the film at least 5% in the machine direction being held in the width direction.

The shrinking ratio as referred to in the invention means the ratio of the shrunk length in the shrinking direction of the film after shrunk to the length of the original film before not as yet shrunk.

The shrinking ratio is preferably from 5 to 40%, more preferably from 10 to 30%.

(Saponification Treatment)

The alkali saponification may enhance the adhesiveness of the cellulose acylate film to the material of a polarizing element such as polyvinyl alcohol, and the film is favorably used as a protective film of polarizer. Methods for the saponification is described in JP-A-2007-86748, paragraphs [0211] and [0212], methods for producing the polarizing element of polarizer and the optical property of the polarizer are described in JP-A-2007-86748, paragraphs [0213] to [0255], and the polarizer using the film of the invention as a protective film can be produced by these descriptions.

The alkali saponification of the cellulose acylate film, for example, is preferably according to a cycle of dipping the film surface in an alkali solution, then neutralizing it with an acid solution, rinsing it with water and drying it. The alkali solution includes a potassium hydroxide solution and a sodium hydroxide solution, in which the hydroxide ion concentration preferably falls within a range of from 0.1 to 5.0 mol/liter, more preferably from 0.5 to 4.0 mol/liter. The alkali solution temperature is preferably from room temperature to 90° C., more preferably from 40 to 70° C.

<Thickness of Protective Film of Polarizers

The thickness of the protective film of polarizer of the invention is preferably from 30 μm to 100 μm, further preferably from 30 μm to 80 μm, most preferably from 35 μm to 65 μm.

[Polarizer]

The polarizer generally comprises a polarizing element and two protective films which are provided in both side of the polarizing element. The protective film of polarizer of the invention can be used as at least one of the protective films. The protective film on the other side may be a normal cellulose acetate film. The polarizing element includes an iodine-containing polarizing element, a dye-containing polarizing element using a dichroic dye, and a polyene-based polarizing element. The iodine-containing polarizing element and the dye-containing polarizing element are generally produced by using a polyvinyl alcohol-based film. In the case of using the protective film of polarizer of the invention as a protective film of a polarizer, the method for producing the polarizer is not particularly limited, and the polarizer may be produced by a commonly employed method. There has been known a method which comprises subjecting the resultant cellulose acylate film to an alkali treatment and bonding the film on both sides of a polarizing element that has been prepared by stretching a polyvinyl alcohol film in an iodine solution, using an aqueous solution of a completely saponified polyvinyl alcohol aqueous solution. As a substitute for the alkali treatment, an easily adhesive processing may be conducted, as disclosed in JP-A-6-94915 and JP-A-6-118232. Examples of the adhesive to be used for bonding the treated surface of the protective film to the polarizing element include polyvinyl alcohol-based adhesives such as a polyvinyl alcohol-based adhesive and a polyvinyl butyral-based adhesive and vinyl-based latexes such as a butyl acrylate-based latex. The polarizer is constituted by the polarizing element and the protective films for protecting both sides of the polarizing element and, further, a protection film provided on one side of the polarizer and a separable film provided on the opposite side thereof. The protection film and the separable film are used for the purpose of protecting the polarizer upon shipping, checking the product and so on. In this case, the protection film is bonded for the purpose of protecting the surface of the polarizer and is used on the side opposite to the side which is to be bonded onto a liquid crystal plate. On the other hand, the separable film is used for the purpose of covering the adhesive layer to be laminated onto the liquid crystal plate and is used on the side which is to be bonded onto the liquid crystal cell.

In the case where the protective plate of polarizer of the invention is a retardation film, it is preferable that the protective film of polarizer of the invention is bonded onto the polarizing element so that the transmission axis of the polarizing element is substantially parallel to the slow axis of the protective film of polarizer of the invention.

The liquid crystal display of the invention, it is preferable that the transmission axis of the polarizing element is substantially parallel to the slow axis of the protective film of polarizer of the invention. In this invention, "substantially parallel" means that a deviation between the direction of the main refractive index (nx) of the protective film of polarizer of the invention and the direction of the transmission axis of the polarizing element is within 5 degrees. The deviation is preferably within 1°, more preferably within 0.5°. In the case where the deviation is over 1°, polarizing performance under cross-Nicol position of the polarizer is deteriorated and thus there arises filtering of light.

<Performance of the Polarizers

The cross transmittance CT of the polarizer is measured by using UV3100PC (manufactured by SHIMADZU CORPORATION) within a range of 380 nm to 780 nm, and the mean of values measured 10 times is adopted.

The polarizer durability test can be carried out in two modes including (1) the polarizer alone and (2) the polarizer bonded to a glass plate via a pressure-sensitive adhesive. To measure (1) the polarizer alone, two samples each having the protective film of polarizer of the invention are placed so that the protective film can be between two polarizing elements, and located orthogonally followed by the measurement. In the mode of (2) bonding the polarizer to a glass plate, two samples (about 5 cm×5 cm) each having the polarizer bonded to the glass plate in such a manner that the protective film of polarizer of the invention is in the glass plate side are prepared. The single plate transmittance is measured by setting the film side of the samples toward a light source. Two samples are measured respectively and the mean is referred to as the transmittance of single plate. In the EXAMPLES of the invention, the test mode of (2) was adopted among the above test mode of (1) and the test mode of (2).

Preferable range of the polarization property of the polarizer is that the cross transmittance CT is at most 2.0%, more preferably CT is at most 1.3%.

In the polarizer durability test, the variation of the CT is preferably small. It is preferable that a cross transmittance variation (%) of the polarizer of the invention is at most 0.70% in the case where the polarizer is preserved still at 60° C., relative humidity 95%, 500 hours; and is at most 0.15% in the case where the polarizer is preserved still at 80° C., Dry (without controlling the humidity, in Examples of the invention, it is relative humidity from 0 to 20%), 500 hours. The cross transmittance variation (%) of the polarizer of the invention in the case where the polarizer is preserved still at 60° C., relative humidity 95%, 500 hours is preferably at most 0.30%, more preferably at most 0.05%. On the other hand, the cross transmittance variation (%) of the polarizer of the invention in the case where the polarizer is preserved still at 80° C., Dry, 500 hours is preferably at most 0.10%, more preferably at most 0.05%.

Here, the variation indicates a value obtained by subtracting the measured value before the test from the measured value after the test.

By satisfying above range of the cross transmittance variation, it is preferable that the stability of the polarizer during use or storage under high temperature and high humidity is ensured.

<Functionalization of Polarizers

The polarizer of the invention may be preferably used as a functionalized polarizer by combining with an antireflection film for improving visibility of the display, a brightness increasing film, or an optical film having a functional layer such as a hard coating layer, a forward scattering layer, or an antiglare (antidazzle) layer. An antireflection film, a brightness increasing film, other functional optical films having a hard coating layer, a forward scattering layer, an antiglare (antidazzle) layer for functionalizing the polarizer are described in JP-A-2007-86748, paragraph [0257] to [0276], and the functionalized polarizer can be produced by these descriptions.

(Antireflection Film)

The polarizer of the invention can be used in combination with an antireflection film. As the antireflection film, use may be made of a film having a reflectivity of about 1.5% which is composed of a single layer of a low refractive material such as a fluoropolymer, or a film having a reflectivity of about 1% with the use of the interference of thin layers. It is preferable in the invention that a low refractive layer and at least one more layer having a higher refractive index higher than the low refractive layer (i.e., a high refractive layer or a middle refractive layer) are laminated on a transparent support. In the invention, moreover, use can be also preferably made of anti-reflection films described in Nitto Giho, Vol. 38, No. 1, May 2000, p. 26 to 28, JP-A-2002-301783 and so on.

The refractive indexes of the layers respectively satisfy the following relations.

Refractive index of high refractive layer>Refractive index of middle refractive layer>Refractive index of transparent support>Refractive index of low refractive layer.

As the transparent support to be used in the antireflection film, use may be preferably made of the above mentioned transparent polymer films for the protective film of the polarizer.

The refractive index of the low refractive layer is preferably from 1.20 to 1.55, and more preferably from 1.30 to 1.50. It is preferred that the low refractive layer is used as the outermost layer having a scratch resistance and antifouling properties. It is also preferred to use a silicone-containing compound or a fluorine-containing compound, etc, for imparting slipperiness to the surface to thereby improve the scratch resistance.

As the fluorine-containing compound, use can be preferably made of, for example, compounds disclosed in JP-A-9-222503, paragraphs [0018] to [0026]; JP-A-11-38202, paragraphs [0019] to [0030]; JP-A-2001-40284, paragraph [0027] to [0028]; JP-A-2000-284102, etc.

As the silicone-containing compound, a compound having a polysiloxane structure is preferred. It is also possible to use reactive silicones such as SILAPLANE (manufactured by Chisso Corporation) and polysiloxanes having silanol end groups disclosed in JP-A-11-258403, etc. therefor. Also, use can be made of a compound prepared by hardening an organic metal compound such as a silane coupling agent and a silane coupling agent having a particular fluorohydrocarbon group by a condensation reaction in the presence of a catalyst (i.e., compounds disclosed in JP-A-58-142958, JP-A-58-147483, JP-A-58-147484, JP-A-9-157582, JP-A-11-106704, JP-A-2000-117902, JP-A-2001-48590, JP-A-2002-53804, etch).

The low refractive layer may preferably contain another additive such as a filler (for example, a low refractive inorganic compound having an average primary particle size of 1 to 150 nm composed such as silicon dioxide (silica) or a fluorine-containing compound (magnesium fluoride, calcium fluoride, barium fluoride, etch), organic microparticles disclosed in JP-A-11-3820, paragraphs [0020] to [0038], and so on), a silane coupling agent, a slipping agent, or a surfactant.

The low refractive layer may be formed by the gas phase method (for example, the vacuum deposition method, the sputtering method, the ion plating method, the plasma CVD method, etc.). However, it is preferable from the viewpoint of inexpensiveness to form the low refractive layer by the coating method. Preferred examples of the coating methods include the dip coating method, the air-knife coating method, the curtain coating method, the roller coating method, the wire bar coating method, the gravure coating method, and the microgravure coating method.

The thickness of the low refractive layer is preferably from 30 to 200 nm, more preferably from 50 to 150 nm, and most preferably from 60 to 120 nm.

It is preferable that the middle refractive layer and the high refractive layer have constitutions wherein ultramicroparticles of a high refractive inorganic compound having an average particle size of 100 nm or less are dispersed in a matrix material. As the ultramicroparticles of a high refractive inorganic compound, use can be preferably made of an inorganic compound having a refractive index of 1.65 or more such as an oxide of Ti, Zn, Sb, Sn, Zr, Ce, Ta, La, In, etc, or a composite oxide containing such a metal atom.

These ultramicroparticles may be used in the state of, for example, having been surface-treated with a surface treatment agent (for example, silane coupling agents disclosed in JP-A-11-295503, JP-A-11-153703, JP-A-2000-9908, etc.; or anionic compounds or organic metal coupling agents disclosed in JP-A-2001-310432, etc.), having a core-shell structure carrying high refractive particles as cores (JP-A-2001-166104, etch), or using together a particular dispersant (for example, JP-A-11-153703, U.S. Pat. No. 6,210,858B1, JP-A-2002-2776069, etc.) and so on.

As the matrix material, use may be made of a known thermoplastic resin, a hardening resin coating, etc. Also, use can be made of a polyfunctional material disclosed in JP-A-2000-47004, JP-A-2001-315242, JP-A-2001-31871, JP-A-2001-296401, etc. or a hardening film obtained from a metal alkoxide composition as disclosed in JP-A-2001-293818, etc.

The refractive index of the high refractive layer is preferably from 1.70 to 2.20. The thickness of the high refractive layer is preferably from 5 nm to 10 μm, and more preferably from 10 nm to 1 μm.

The refractive index of the middle refractive layer is controlled at a value between those of the low refractive layer and the high refractive layer. The refractive index of the middle refractive layer is preferably from 1.50 to 1.70.

It is preferable that the haze of the antireflection film is 5% or less, and more preferably 3% or less. The strength of the film is preferably H or more, more preferably 2H or more, and most preferably 3H or more, in a pencil hardness test in accordance with JIS K5400.

(Brightness Increasing Film)

In the invention, the polarizer may be used in combination with a brightness increasing film. The brightness increasing film, which has a function of separating a circular polarized light or a linearly polarized light, is placed between the polarizer and a backlight and reflects or scatters one circular polarized light or linearly polarized light backward to the backlight. The light re-reflected by the backlight undergoes a partial change in the polarization state and is partly transmitted through the brightness increasing film and the polarizer upon the injection thereinto. By repeating this process, the light utilization ratio is increased and thus the front brightness is elevated by about 1.4 times. As such a brightness increasing film, there have been known an anisotropy reflection type film and an anisotropy scattering type film both of which can be combined with the polarizer according to the invention.

In the anisotropy reflection type, there has been known a brightness increasing film in which a uniaxially stretched films and unstretched films are laminated to enlarge the refractive index difference in the stretch direction, thereby achieving a reflectivity and a transmittance anisotropy. Known examples of such brightness increasing films include multilayer films using the theory of dielectric mirror (disclosed in WO 95/17691, WO 95/17692 and WO 95/17699) and cholesteric liquid crystal films (disclosed in EP No. 606940A2 and JP-A-8-271731). In the invention, use is preferably made of DBEF-E, DBEF-D and DBEF-M (each manufactured by 3M) as the multilayer brightness increasing film using the theory of dielectric mirror principle, while NIPOCS (manufactured by Nitta Denko Corporation) is preferably used as the cholesteric liquid crystal brightness increasing film. Concerning NIPOCS, reference may be made to Nitto Giho, Vol. 38, No. 1, May 200, p. 19 to 21, etc.

In the invention, it is also preferable to use an anisotropy scattering type brightness increasing film, which is prepared by blending a positive intrinsic birefringence polymer and a negative intrinsic birefringence polymer and by uniaxial stretching as disclosed in WO 97/32223, WO 97/32224, WO 97/32225, WO 97/32226, JP-A-9-274108, and JP-A-11-174231, in combination. As the anisotropy scattering type brightness increasing film, DRPF-H (manufactured by 3M) is preferred.

(Other Functional Optical Films)

It is preferable that the polarizer of the invention is used in combination with a functional optical film having a hard coating layer, a forward scattering layer, an antiglare (anti-dazzle) layer, a gas barrier layer, a slipping layer, an antistatic layer, an undercoat layer, a protective layer, etc. It is also preferred that these functional layers are combined with the antireflection layer of the antireflection film or the optically anisotropic layer within a single layer. These functional layers may be provided on either or both of the polarizing element side and the opposite side (i.e., close to the air interface).

[Hard Coating Layer]

In the invention, it is a preferable practice to combine the polarizer with a functional optical film provided with a hard coating layer on a transparent support to thereby improve the mechanical strength such as scratch resistance. In the case of applying the hard coating layer to the above-described antireflection film, in particular, it is preferable that the hard coating layer is formed between the transparent support and the high refractive layer.

It is preferable to form the hard coating layer by a crosslinking reaction of a hardening compound by light and/or heat, or a polymerization reaction. A photopolymerizable group is preferable as a hardening functional group, while an organic alkoxysilyl compound is preferable as a hydrolyzable functional group-containing organic metal compound. Concerning the specific composition of the hard coating layer, use can be preferably made of those disclosed in JP-A-2002-144913, JP-A-2000-9908 and WO 00/46617, etc.

The thickness of the hard coating layer is preferably from 0.2 to 100 μm.

The strength of the hard coating layer is preferably H or more, more preferably 2H or more, and most preferably 3H or more, by a pencil hardness test in accordance with JIS K5400. Further, it is more preferable that the hard coating layer shows a smaller abrasion in a test piece before and after a taber test according to JIS K5400.

As the material for forming the hard coating layer, use can be made of a compound having an unsaturated ethylenic group and a compound having a ring opening polymerizable group. Either a single compound or a combination of such compounds may be used. Preferable examples of the compound having an unsaturated ethylenic group include polyol polyacrylates such as ethyleneglycol diacrylate, trimethylolpropane triacrylate, ditrimethylolpropane tetraacrylate, pentaerythritol triacrylate, pentaerythritol tetraacrylate, dipentaerythritol pentaacrylate and dipentaerythritol hexaacrylate; epoxy acrylates such as diacrylate of bisphenol A diglycidyl ether and diacrylate of hexanediol diglycidyl ether; and urethane acrylates obtained by a reaction of a polyisocyanate and a hydroxyl-containing acrylate such as hydroxyethyl acrylate. Examples of commercially available compounds include EB-600, EB-40, EB-140, EB-1150, EB-12901K, IRR214, EB-2220, TMPTA and TMPTMA (each manufactured by Daicel ucb), and UV-6300 and UV-1700B (each manufactured by Nippon Synthetic Chemical Industry Co., Ltd).

Preferable examples of the compound having a ring opening polymerizable group include glycidyl ethers such as ethylene glycol diglycidyl ether, bisphenol A diglycidyl ether, trimethylolethane triglycidyl ether, trimethylolpropane triglycidyl ether, glycerol triglycidyl ether, triglycidyl trishydroxyethyl isocyanurate, sorbitol tetraglycidyl ether, pentaerythritol tetraglycidyl ether, polyglycidyl ethers of cresol novolac resins and polyglycidyl ethers of phenol novolac resins; alicyclic epoxys such as CELOXIDE 2021P, CELOXIDE 2081, EPOLEAD GT-301, EPOLEAD GT-401, and ERPE3150CE (each manufactured by Daicel Chemical Industries, Ltd.), and polycyclohexyl epoxymethyl ether of phenol novolac resins; oxetanes such as OXT-121, OXT-221, OX-SQ, and PNOX-1009 (each manufactured by Toagosei Co., Ltd.). Further, polymers of glycidyl(meth)acrylate, and copolymers of glycidyl(meth)acrylate with a monomer copolymerizable therewith may be used for the hard coating layer.

In the hard coating layer, it is a preferable practice to employ microparticles of oxides of silicon, titanium, zirconium, aluminum, etc., crosslinked particles of polyethylene, polystyrene, poly(meth)acrylates, polydimethylsiloxane, etc., and crosslinked microparticles such as organic microparticles of crosslinked rubber, e.g., SBR, NBR, etc. to reduce hardening shrinkage of the hard coating layer, increase the adhesion thereof to the substrate, and reduce curling of the hard-coated article. The average particle size of these crosslinked microparticles is preferably from 1 to 20,000 nm. The shape of the crosslinked microparticles may be a spherical shape, rod-shaped shape, needle-like shape, tabular shape, etc without specific restriction. It is preferable that the microparticles are added in such an amount that the microparticle content of the hardened hard coating layer is 60% by volume or less, and more preferably 40% by volume or less.

The above described inorganic microparticles are generally poor in affinity for binder polymers. In the case of adding these inorganic microparticles, therefore, it is preferable to conduct a surface treatment by using a surface treatment agent having a metal such as silicon, aluminum or titanium, and a functional group such as an alkoxide group, a carboxylic acid group, a sulfonic acid group, or a phosphonic acid group.

It is preferable that the hard coating layer is hardened by using heat or an activation energy ray. It is more preferable to use an activation energy ray such as a radioactive ray, a gamma ray, an alpha ray, an electron ray, or a ultraviolet ray therefor, and particularly preferably by an electron ray or a ultraviolet ray in view of safety and productivity. In the case of the heat hardening, the heating temperature is preferably 140° C. or lower, and more preferably 100° C. or lower, in view of the heat resistance of the plastic per se.

[Forward Scattering Layer]

The forward scattering layer is used for improving the viewing angle properties (the hue and brightness distribution) in the directions of up/down, and right/left, of the liquid crystal display device to which the polarizer according to the invention is mounted. In the invention, it is preferable that the forward scattering layer is composed of microparticles with different refractive indexes dispersed in a binder. For example, use can be made of the forward scattering layer having a structure wherein the forward scattering coefficient is particularly specified as described in JP-A-11-38208, the relative refractive index between a transparent resin and microparticles is controlled within a specific range as described in JP-A-2000-199809, or the haze is controlled to 40% or more as described in JP-A-2002-107512. It is also preferable that the polarizer of the invention is used in combination with LUMISTY (described in Sumitomo Chemical Con, Ltd., Technical Report, Ko-kinosei Firumu (Optical functional film), p. 31 to 39) to thereby control the haze viewing angle properties.

[Antiglare Layer]

The antiglare (antidazzle) layer is used for scattering a reflected light to thereby prevent external light reflection. The antiglare function is achieved by forming peaks and valleys on the outermost surface of the liquid crystal display device. The haze of the optical film having the antiglare function is preferably 3 to 30%, more preferably 5 to 20%, and most preferably 7 to 20%.

To form the peaks and valleys on the film surface, use may be preferably made of, for example, a method of adding microparticles (see, for example, JP-A-2000-271878, etc.), a method of adding a small amount (0.1 to 50% by mass) of relatively large particles having a size of 0.05 to 2 μm to thereby form a film having peaks and valleys on the surface (JP-A-2000-281410, JP-A-2000-95893, JP-A-2001-100004, JP-A-2001-281407, etc.), or a method of physically transferring the peaks and valleys to the film surface (see, for example, an embossing method disclosed in JP-A-63-278839, JP-A-11-183710, JP-A-2000-275401, etc.).

<Liquid Crystal Display Device>

Next, the liquid crystal display device according to the invention will be described.

FIG. 1 is a schematic view showing an example of the liquid crystal display device according to the invention. In FIG. 1, a liquid crystal display device 10 comprises a liquid crystal cell containing a liquid crystal layer 5 and an upper electrode substrate 3 and a lower electrode substrate 6 respectively provided thereabove and therebelow, and an upper polarizer 1 and a lower polarizer 8 provided on the both sides of the liquid crystal cells. Optionally, a color filter may be provided between the liquid crystal cell and each of the polarizers. In the case where the liquid crystal display device 10 is employed as a transmission type device, it is equipped with a backlight using a light source such as a cold or hot cathode fluorescent tube, a light emitting diode, a field emission device or an electroluminescent device on the back side.

Each of the upper polarizer 1 and the lower polarizer 8 has a laminated structure wherein a polarizing element is interposed between two protective films. In the liquid crystal display device 10 of the invention, at least one of the protective films on the liquid crystal cell side of one of the polarizers is the protective film of polarizer of the invention. As for the liquid crystal display device 10 of the invention is preferably laminated from the outside (side far from a liquid crystal cell) of the device in order of a transparent protective film, a polarizing element, the protective film of polarizer of the invention.

The liquid crystal display device 10 includes an image direct-view type, an image projection type and a light modulation type. The invention can be applied effectively to an active matrix liquid crystal display device using a 3-terminal or 2-terminal semiconductor element such as a TFT or an MIM. Needless to say, it is also effectively applicable to a passive matrix liquid crystal display device represented by an STN mode called time division driving.

(VA Mode)

It is preferable that the liquid crystal cell of the liquid crystal display device of the invention is a VA mode liquid crystal cell.

In a VA mode, liquid crystals having negative dielectric anisotropy and roughly satisfying Δn=0.0813 and Δ∈=−4.6 are injected between upper and lower substrates so as to form about 89° of director showing the alignment direction of liquid crystal molecules (i.e., a so-called tilt angle) by rubbing alignment. In FIG. 1, the thickness d of the liquid crystal layer 5 is preferably set to 3.5 μm. Depending on the product Δnd ((thickness d)×(refraction index anisotropy Δn)), the brightness at the time of white level varies. To attain the maximum brightness, therefore, the thickness of the liquid crystal layer is set to a range of 0.2 μm to 0.5 μm.

The upper polarizer 1 and the lower polarizer 8 of the liquid crystal cell are laminated in such a manner that the respective absorption axis 2 and absorption axis 9 cross with each other approximately perpendicularly. Inside the respective alignment films of the liquid crystal cell upper electrode substrate 3 and the liquid crystal cell lower electrode substrate 6, transparent electrodes (not shown) are formed. In an undriven state where a driving voltage is not applied to electrodes, however, liquid crystal molecules in the liquid crystal layer 5 are aligned approximately vertically to the substrate face. As a result, the polarization state of light passing through the liquid crystal panel is scarcely changed. In this liquid crystal display device, the ideal black level can be achieved at the undriven state. In a driven state, on the contrary, the liquid crystal molecules are inclined in parallel to the substrate face, and light passing through the liquid crystal panel undergoes a change in the polarization state due to these thus inclined liquid crystal molecules. In the liquid crystal display device, in other words, white level is achieved in the driven state. In FIG. 1, numerical symbols 4 and 7 represent the alignment controlling direction.

Since an electric field is applied between the upper and lower substrates, use is made herein of a liquid crystal material having a negative dielectric anisotropy that allows the liquid crystal molecules to respond in the direction perpendicular to the electric field. In the case where the electrodes are provided on one of substrates and an electric field is applied in the lateral direction parallel to the substrate, a material having a positive dielectric anisotropy is used as the liquid crystals.

In a VA mode liquid crystal display device, a chiral agent, which is used generally in TN mode liquid crystal display devices, is not so frequently used because it would degrade the dynamic response properties. However, it is added in some cases for reducing alignment failure.

The VA mode is characterized by showing a high-speed response and a high contrast. However, it suffers from a problem that the contrast is high when viewed from the front but lowered when viewed from an oblique direction. At the time of black level, liquid crystal molecules are aligned perpendicularly to the substrate face. When observed from the front, the liquid crystal molecules show almost no birefringence and thus the transmittance is low and a high contrast can be obtained. When observed from an oblique direction, however, the liquid crystal molecules show birefringence. Moreover, the crossing angle between the absorption axes of the upper and lower polarizers, which is orthogonal (i.e., 90°) when viewed from the front, exceeds 90° when viewed from an oblique direction. Due to these two reasons, there arises light leakage in an oblique direction and thus the contrast is lowered. In the case where the polarizer protection film of the invention is a retardation film, the polarizer protection film of the invention is provided as an optical compensatory sheet (a retardation film) in order to solve this problem.

In the white level where liquid crystal molecules are inclined, the birefringence of liquid crystal molecules varies between the incline direction and the inverse direction, when observed from an oblique direction, which results in the difference in the brightness and hue. To solve this problem, a structure called multidomain, in which a single pixel of a liquid crystal display device is divided into two or more domains, is preferably adopted.

[Multidomain]

In the VA system, for example, liquid crystal molecules are inclined in different multiple domains in a single pixel upon the application of the electric field, thereby averaging viewing angle properties. To divide the alignment in a single pixel, a slit or a peak is formed in the electrode to change the electric field direction or make bias in the electric field density. To obtain even viewing angles in all directions, the number of the divisions is increased. Namely, almost even viewing angles can be achieved by the division into 4, 8 or more domains. It is particularly preferable to divide into 8 domains, since the polarizer absorption axis can be set at an arbitrary angle in this case.

In boundary portions among divided alignment domains, liquid crystal molecules can not respond easily. Thus, black level is maintained in normally black display, which results in a problem of lowering in brightness. To solve the problem, the boundary portions can be reduced by adding a chiral agent to the liquid crystal material.

EXAMPLES

The characteristics of the invention are described more concretely with reference to the following Examples. In the following Examples, the material used, its amount and the ratio, the details of the treatment and the treatment process may be suitably modified or changed. Accordingly, the invention should not be limitatively interpreted by the Examples mentioned below.

Example 101

Production of Protective Film of Polarizer (Preparation of Cellulose Acylate Solution)

A following composition was thrown into a mixing tank, stirred to dissolve respective components, and cellulose acylate solution 1 was prepared.

| Composition of the cellulose acylate solution 1: | |
|---|---|
| Cellulose acylate having an acetyl substitution of 2.43 and a mass average polymerization degree 340 | 100.0 parts by mass |
| Organic acid A | 1.0 parts by mass |
| Methylene chloride (first solvent) | 402.0 parts by mass |
| Methanol (second solvent) | 60.0 parts by mass |

(Preparation of Matting Agent Dispersion Liquid 2)

A following composition was thrown into a mixing tank, stirred to dissolve respective components, and matting agent dispersion liquid 2 was prepared.

| Composition of the matting agent dispersion liquid 2; | |
|---|---|
| Silica particles having an average particle size of 20 nm (AEROSIL R972, manufactured by NIPPON AEROSIL CO., LTD.) | 2.0 parts by mass |
| Methylene chloride (first solvent) | 75.0 parts by mass |
| Methanol (second solvent) | 12.7 parts by mass |
| Cellulose acylate solution 1 | 10.3 parts by mass |

Then, 1.3 parts by mass of the matting agent solution 2 was added to 98.7 parts by mass of the cellulose acylate solution 1 and mixed using in-line mixer. Next, the mixture was cast using a band casting machine. When the residual solvent content attained 40% by mass, the film was peeled off from the band. Then, the film was dried at atmosphere temperature of 140° C. for 20 minutes, and the protective film of polarizer 101 was manufactured. The obtained protective film of polarizer had a thickness of 60 μm.

Saponification Treatment of Protective Film of Polarizer

The protective film of polarizer 101 produced was dipped in a 2.3 mol/L aqueous solution of sodium hydroxide at 55° C. for 3 minutes. Next, the film was washed in a water washing bath at room temperature and then neutralized with 0.05 mol/L sulfuric acid at 30° C. Next, it was washed again in a water washing bath at room temperature and dried in a hot air stream at 100° C. Thus, the surface of the protective film of polarizer 101 was saponified.

Production of Polarizer

Iodine was adsorbed by the stretched polyvinyl alcohol film to prepare a polarizing element.

The saponificated protective film of polarizer of Example 101 was stuck to one surface of the polarizing element, using a polyvinyl alcohol adhesive. A commercial cellulose triacetate film (Fujitac TD80UF, by FUJIFILM Corporation) was saponified in the same method, and the saponificated cellulose triacetate film was stuck to the other side of the polarizing element, using a polyvinyl alcohol adhesive.

The films were so stuck to the polarizing element that the transmission axis of the polarizing element could be parallel to the slow axis of the protective film of polarizer produced in Example 101 and that the transmission axis of the polarizing element could be perpendicular to the slow axis of the commercial cellulose triacetate film.

Thus, the polarizer of Example 101 was manufactured.

Example 102 to 111

Comparative Example 201 to 209

Production of Protective film of Polarizer of Example 102 to 111 and Comparative Example 201 to 209

The protective film of polarizers of Example 102 to 111 and Comparative Example 201 to 209 were produced in the same way as in Example 101 but changing the acyl substitution degree of cellulose acylate, the type and addition amount of the organic acids, and the film thickness as listed in the following Table 1.

In Table 1, the addition amount of the organic acids express parts by mass based on 100 parts by mass of the cellulose acylate resin.

Terephthalic acid, cinnamic acid and citric acid used in Comparative Example 203 to 205, 207 and 208 were used as example compounds in JP-B 4136054, and those Comparative Examples were test for the effect of those compounds.

The structures of the organic acids A to H used in Example and Comparative Example are as follows.

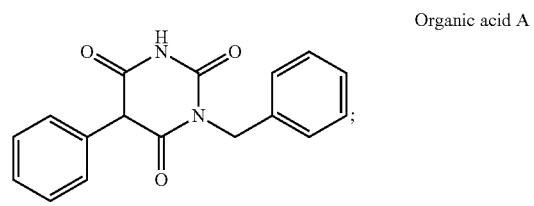

Organic acid A

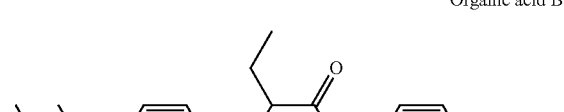

Organic acid B

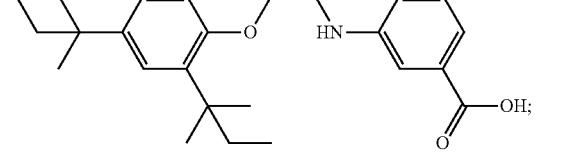

Organic acid C

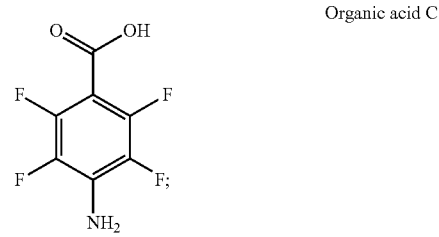

-continued

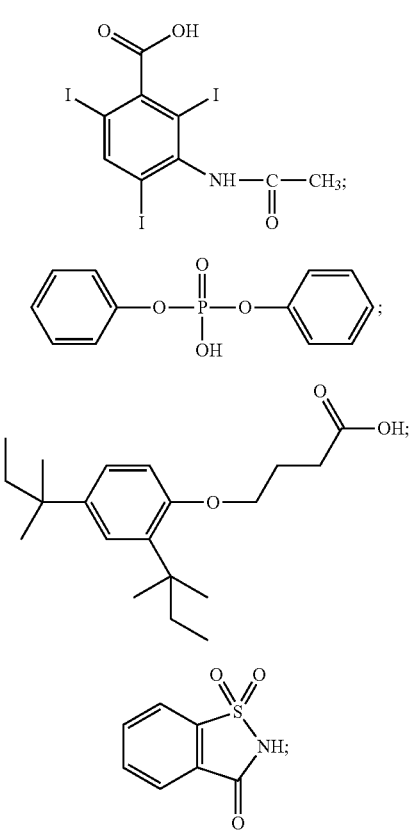

Organic acid D

Organic acid E

Organic acid F

Organic acid H

Each organic acids used in Examples and Comparative Examples was able to obtain by synthesizing or commercially, each of terephthalic acid, cinnamic acid, and citrate used is obtained commercially. The obtainment methods of organic acid A to H are shown below.

Organic acid A was purchased from Tokyo Chemical Industry Co., Ltd.

Organic acid B is able to be synthesized, for example, according to the method described in JP-B 2-30498. After 2,4-bis-(1,1-dimethylpropyl)phenol and ethyl 2-bromobutyrate was reacted in toluene with existence of sodium hydroxide, the solution was hydrolyzed with hydrochloric acid to obtain a corresponding carboxylic acid. Nest, the obtained carboxylic acid was reacted with thionyl chloride to obtain a carboxylic acid chloride, and then the obtained carboxylic acid chloride was reacted with m-aminobenzoic acid in mixture solution of acetonitrile and diacetamide to obtain the Organic acid B.

Organic acid C was purchased from Tokyo Chemical Industry Co., Ltd.

Organic acid D was purchased from Tokyo Chemical Industry Co., Ltd.

Organic acid E was purchased from Tokyo Chemical Industry Co., Ltd.

Organic acid F is able to be synthesized, for example, according to the method described in JPB 2-30498. After 2,4-bis-(1,1-dimethylpropyl)phenol and ethyl 4-bromobutyrate was reacted in toluene with existence of sodium hydroxide, the solution was hydrolyzed with hydrochloric acid to obtain the organic acid F.

Organic acid H was purchased from Tokyo Chemical Industry Co., Ltd.

Saponification Treatment of Protective Film of Polarizer and Production of Polarizer Each protective film of polarizer of Example 102 to 111 and Comparative Example 201 to 209 was saponificated and manufactured in the same way as in Example 101, and then the polarizer of each Examples and Comparative Examples was manufactured.

(Evaluation of Polarizer Durability)

Across transmittance in the wavelength of 410 nm of each polarizer of Examples and Comparative Examples manufactured above was measured in the manner described in this invention.

Then, a cross transmittance of each polarizer was measured in the same manner described above after preserved under 60° C. and relative humidity 95% for 500 hours and after preserved under 80° C. without controlling humidity for 500 hours. The cross transmittance variation of the polarizer before and after the preservation was calculated and the result was shown in Table 1 as polarizer durability. In addition, the relative humidity under environment without humidity control was fall within the range of 0% to 20%.

TABLE 1

| | Acyl substituted degree of cellulose acylate | | | Organic acid | | | | Amount | Property of film | Property of polarizer Polarizer durability: Cross transmittance variation (%) | |
|---|---|---|---|---|---|---|---|---|---|---|---|
| | Acetyl | Propionyl | Total | Sorts | Acid dissociation constant | Molecular weight | Solubility to water | (mas. pt.) | Thickness (μm) | 60° C., 95%, 500 hours | 80° C., Dry, 500 hours |
| Ex. 101 | 2.43 | 0 | 2.43 | A | 4.0 | 294 | Less than 0.5 wt % | 1.0 | 60 | 0.68 | 0.09 |
| Ex. 102 | 2.43 | 0 | 2.43 | A | 4.0 | 294 | Less than 0.5 wt % | 2.0 | 60 | 0.47 | 0.07 |
| Ex. 103 | 2.43 | 0 | 2.43 | A | 4.0 | 294 | Less than 0.5 wt % | 4.0 | 60 | 0.04 | 0.05 |
| Ex. 104 | 2.43 | 0 | 2.43 | B | 6.6 | 440 | Less than 0.5 wt % | 4.0 | 60 | 0.29 | 0.06 |
| Ex. 105 | 2.43 | 0 | 2.43 | C | 5.0 | 209 | 0.7 wt % | 4.0 | 60 | 0.05 | 0.11 |
| Ex. 106 | 2.43 | 0 | 2.43 | D | 4.4 | 557 | Less than 0.5 wt % | 4.0 | 60 | 0.05 | 0.07 |
| Ex. 107 | 2.43 | 0 | 2.43 | H | 2.6 | 183 | 0.6 wt % | 4.0 | 60 | 0.05 | 0.16 |
| Comp. Ex. 201 | 2.43 | 0 | 2.43 | E | 1.5 | 297 | Less than 0.5 wt % | 4.0 | 60 | 0.69 | 0.19 |
| Comp. Ex. 202 | 2.43 | 0 | 2.43 | F | 7.3 | 320 | Less than 0.5 wt % | 4.0 | 60 | 0.82 | 0.08 |
| Comp. Ex. 203 | 2.43 | 0 | 2.43 | Terephthalic acid | 4.5 | 166 | More than 1 wt % | 4.0 | 60 | 0.23 | 0.23 |

TABLE 1-continued

| | Acyl substituted degree of cellulose acylate | | | Organic acid | | | | Amount (mas. pt.) | Property of film Thickness (μm) | Property of polarizer Polarizer durability: Cross transmittance variation (%) | |
|---|---|---|---|---|---|---|---|---|---|---|---|
| | Acetyl | Propionyl | Total | Sorts | Acid dissociation constant | Molecular weight | Solubility to water | | | 60° C., 95%, 500 hours | 80° C., Dry, 500 hours |
| Comp. Ex. 204 | 2.43 | 0 | 2.43 | Cinnamic acid | 4.7 | 148 | More than 1 wt % | 4.0 | 60 | 0.24 | 0.24 |
| Comp. Ex. 205 | 2.43 | 0 | 2.43 | Citric acid | 4.0 | 192 | More than 1 wt % | 4.0 | 60 | 0.22 | 0.25 |
| Comp. Ex. 206 | 2.43 | 0 | 2.43 | Nothing | — | — | — | 0.0 | 60 | 0.95 | 0.10 |
| Ex. 111 | 1.3 | 0.8 | 2.10 | A | 3.0 | 553 | Less than 0.5 wt % | 3 | 40 | 0.04 | 0.06 |
| Comp. Ex. 207 | 1.3 | 0.8 | 2.10 | Terephthalic acid | 4.5 | 166 | More than 1 wt % | 3 | 40 | 0.09 | 0.18 |
| Comp. Ex. 208 | 1.3 | 0.8 | 2.10 | Citric acid | 4.0 | 192 | More than 1 wt % | 3 | 40 | 0.09 | 0.22 |
| Comp. Ex. 209 | 1.3 | 0.8 | 2.10 | Nothing | — | — | — | 0 | 40 | 0.74 | 0.08 |

From the results of Table 1 it was shown that the polarizer including a protective film of polarizer of the invention was not deteriorated easily after both high temperature and high humidity condition and high temperature and low humidity condition, and was preferable.

Example 301

Production of Liquid Crystal Display Device

After stripping off two polarizer of a commercially available liquid crystal TV set (BRAVIA J5000, manufactured by Sony Corporation), and one sheet of polarizers of the invention using the protective film of polarizer of Example 101 was applied to the viewer side and one sheet of polarizers of the invention using the protective film of polarizer of Example 101 was applied to the backlight side through an adhesive agent such that each of the protective film of polarizer of Example 101 came to the liquid crystal cell side. These polarizers of the invention were disposed in a cross-Nicol arrangement where the transmission axis of the viewer side polarizer ran in the up/down direction and the transmission axis of the backlight side polarizer ran in the right/left direction. When the thus-produced liquid crystal display device of the invention was observed from the oblique direction after the environmental humidity was changed, small contrast variation and small color tint change were advantageously obtained as compared with the commercially available liquid crystal television set. And when the liquid crystal display device of the invention was used for a long time under both high temperature and high humidity condition and high temperature and low humidity condition, degradation of the contrast was small, and it was preferable.

The present disclosure relates to the subject matter contained in Japanese Patent Application No. 275162/2009 filed on Dec. 3, 2009, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A protective film of polarizer comprising a composition which comprises a cellulose acylate resin and an organic acid that has a solubility in water at 25° C. of at most 0.1% by mass and has an acid dissociation constant in a mixed solvent of tetrahydrofuran/water=6/4 by volume at 25° C. of from 2 to 7, wherein the organic acid is represented by the following formula (3):

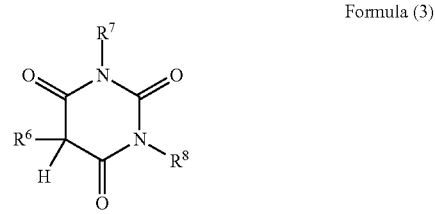

Formula (3)

wherein $R^6$ represents an aryl group which may have a substituent, $R^7$ and $R^8$ each independently represents a hydrogen atom, an alkyl group or an aryl group; and $R^7$ may have a substituent when $R^7$ represents an alkyl group or an aryl group.

2. The protective film of polarizer according to claim 1, wherein the molecular weight of the organic acid is from 200 to 600.

3. The protective film of polarizer according to claim 1, wherein $R^7$ and $R^8$ each independently represents a hydrogen atom, a methyl group, an ethyl group, a cyclohexyl group or a phenyl group.

4. The protective film of polarizer according to claim 1, wherein $R^7$ represents an aryl group and $R^8$ represents a hydrogen atom.

5. The protective film of polarizer according to claim 1, wherein the content of the organic acid is from 1 to 20% by mass of the cellulose acylate resin.

6. The protective film of polarizer according to claim 1, wherein $R^7$ represents a phenyl group.

7. A polarizer comprising a film comprising a composition which comprises a cellulose acylate resin and an organic acid that has a solubility in water at 25° C. of at most 0.1% by mass and has an acid dissociation constant in a mixed solvent of tetrahydrofuran/water=6/4 by volume at 25° C. of from 2 to 7,
wherein the organic acid is represented by the following formula (3):

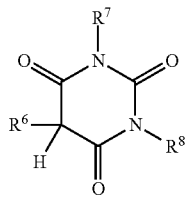

Formula (3)

wherein $R^6$ represents an aryl group which may have a substituent, $R^7$ and $R^8$ each independently represents a hydrogen atom, an alkyl group or an aryl group; and $R^7$ may have a substituent when $R^7$ represents an alkyl group or an aryl group.

8. The polarizer according to claim 7, comprising a polarizing element protected by the film.

9. The polarizer according to claim 7, wherein $R^7$ represents a phenyl group.

10. A liquid crystal display device comprising a film comprising a composition which comprises a cellulose acylate resin and an organic acid that has a solubility in water at 25° C. of at most 0.1% by mass and has an acid dissociation constant in a mixed solvent of tetrahydrofuran/water=6/4 by volume at 25° C. of from 2 to 7,
wherein the organic acid is represented by the following formula (3):

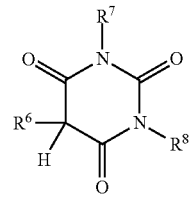

Formula (3)

wherein $R^6$ represents an aryl group which may have a substituent, $R^7$ and $R^8$ each independently represents a hydrogen atom, an alkyl group or an aryl group; and $R^7$ may have a substituent when $R^7$ represents an alkyl group or an aryl group.

11. The liquid crystal display device according to claim 10, comprising a polarizing element protected by the film.

12. The liquid crystal display device according to claim 10, wherein $R^7$ represents a phenyl group.

* * * * *